United States Patent
Hicks

(10) Patent No.: US 8,032,930 B2
(45) Date of Patent: Oct. 4, 2011

(54) SEGREGATING ANONYMOUS ACCESS TO DYNAMIC CONTENT ON A WEB SERVER, WITH CACHED LOGONS

(75) Inventor: Brian C. Hicks, Redwood City, CA (US)

(73) Assignee: Intuit Inc., Mountain View, CA (US)

( * ) Notice: Subject to any disclaimer, the term of this patent is extended or adjusted under 35 U.S.C. 154(b) by 455 days.

(21) Appl. No.: 12/253,775

(22) Filed: Oct. 17, 2008

(65) Prior Publication Data

US 2010/0107227 A1    Apr. 29, 2010

(51) Int. Cl.
*G06F 7/04*         (2006.01)
*G06F 15/16*        (2006.01)
*G06F 17/30*        (2006.01)
*H04L 29/06*        (2006.01)

(52) U.S. Cl. ............ 726/5; 726/8; 726/9; 709/225; 709/229; 707/999.009; 713/165; 713/166; 713/167; 713/182; 713/186; 380/255

(58) Field of Classification Search .............. 726/5, 8, 726/9; 707/783, 784; 705/51; 713/182, 713/186

See application file for complete search history.

(56) References Cited

U.S. PATENT DOCUMENTS

| | | | | |
|---|---|---|---|---|
| 5,923,842 A * | 7/1999 | Pedersen et al. | | 726/8 |
| 6,067,559 A | 5/2000 | Allard | | |
| 6,338,064 B1 | 1/2002 | Ault | | |
| 7,072,807 B2 * | 7/2006 | Brown et al. | | 703/1 |
| 7,162,509 B2 * | 1/2007 | Brown et al. | | 709/201 |
| 7,200,530 B2 * | 4/2007 | Brown et al. | | 703/1 |
| 7,353,282 B2 * | 4/2008 | Nichols et al. | | 709/229 |
| 7,412,422 B2 * | 8/2008 | Shiloh | | 705/74 |
| 7,434,253 B2 * | 10/2008 | Crall et al. | | 726/10 |
| 7,630,877 B2 * | 12/2009 | Brown et al. | | 703/21 |
| 7,765,195 B2 * | 7/2010 | Miller et al. | | 707/695 |
| 2002/0069139 A1 * | 6/2002 | Bernstein et al. | | 705/27 |
| 2003/0126136 A1 * | 7/2003 | Omoigui | | 707/10 |
| 2005/0182742 A1 * | 8/2005 | Griffin et al. | | 707/1 |
| 2005/0203792 A1 * | 9/2005 | Kuppe et al. | | 705/10 |
| 2005/0210142 A1 * | 9/2005 | de Jong et al. | | 709/228 |
| 2006/0242405 A1 * | 10/2006 | Gupta et al. | | 713/156 |
| 2006/0248011 A1 * | 11/2006 | Hecht-Nielsen et al. | | 705/44 |
| 2007/0016782 A1 * | 1/2007 | Crall et al. | | 713/175 |
| 2008/0109427 A1 * | 5/2008 | Miller et al. | | 707/5 |
| 2008/0244718 A1 * | 10/2008 | Frost et al. | | 726/8 |
| 2009/0055921 A1 * | 2/2009 | Field et al. | | 726/14 |
| 2009/0165125 A1 * | 6/2009 | Brown et al. | | 726/21 |

FOREIGN PATENT DOCUMENTS

WO    2004059940 A1    7/2004

* cited by examiner

*Primary Examiner* — April Shan
(74) *Attorney, Agent, or Firm* — Park, Vaughan, Fleming & Dowler LLP

(57) ABSTRACT

A system and method are provided for segregating access to dynamic content on multiple websites hosted by a web server. When a request is received for dynamic content from a website, a UserRetriever module identifies a path to the content and retrieves a username and password corresponding to the website, from a database that is separate from the web server and used for other purposes (e.g., billing). A UserImpersonator module requests a logon handle for that username from a logon cache manager. The logon handle is used to associate the request with the impersonated user account instead of the default anonymous user account with which the request was initially associated. The dynamic content is retrieved and served under the context of the restricted impersonated user account session, after which the applied logon handle is stripped off and the request is re-associated with the default anonymous user account.

15 Claims, 4 Drawing Sheets

Logon Handle Request Structure 410

SEGREGATING ANONYMOUS ACCESS TO DYNAMIC CONTENT ON A WEB SERVER, WITH CACHED LOGONS

BACKGROUND

Webhosting organizations often manage extensive operations, hosting thousands, tens of thousands and even a hundred thousand or more website customers on a single server or collection of servers. Performance and security issues require close attention so that the widest available access is offered to content, while maintaining adequate security of each customer's data.

The level and type of security required when only serving static content (e.g., .html, .jpeg) is quite different from the security that must be applied when serving dynamic content (e.g., executables, scripts). In addition to preventing website visitors from viewing content to which access is restricted (e.g., password-protected pages), it is necessary to further restrict dynamic content so that one customer's scripts (or other executable content processed within a shared server environment) are unable to access another customer's data stored within the same environment.

For example, if only static content is permitted, and all visitors are authorized to view all hosted content (e.g., no customers employ logon schemes to filter access), then security needs are relatively uniform and basic. However, when scripts and/or executable images are permitted to run within a shared web server environment, the range of actions a customer can instruct the web server to perform on its behalf increases significantly. In particular, a customer's scripts may maliciously or accidentally (e.g., through poor programming) damage, destroy or otherwise illicitly access another customer's data.

But, if security restrictions are too stringent, access to a particular piece of content may be mistakenly prohibited, access to authorized content may be delayed, management of the server and the content may become very complex because of onerous security considerations, and so on. The result is an ineffectual web hosting solution that does not adequately serve the needs of customers.

Even while adequate security measures must be enforced to protect each customer's data from other customers, the ability to automatically and anonymously logon web site visitors should be maintained. This allows them to anonymously interact with web site content without the inconvenience of first obtaining logon credentials from a centralized authority (e.g., a username and password, a digital certificate). More specifically, it is beneficial and desirable to give anonymous access to visitors while allowing customer's scripts to be run on the visitors' behalf behind the scenes.

Existing attempts to secure a web server while still allowing automatic and anonymous logons are inadequate or ineffective, especially if dynamic content (e.g., scripts) is served. For example, in many webhosting environments, all anonymous content viewers are automatically logged into the web server using the same server account, regardless of the content they are accessing (e.g., a static web page, an image, a script, an executable). This type of solution does not solve the problem of trying to restrict access to one customer's data from another customer's scripts.

When all anonymous web site visitors share one account, they share one security context and there is no inherent or easy way to differentiate one visitor from another. Therefore, a fileserver, the web server or other arbiter of access to stored data cannot readily differentiate between who should be allowed and who should not be allowed access to a given content file. Unless all visitors (and all scripts that run as a result of a page view) are to have access to all content, individual customers (or other involved entities) will generally have to assign (and distribute) user accounts in order to implement logon procedures for accessing protected content.

More specifically, if executable content (e.g., scripts, executables) is served on a web server, security must be configured robustly to prevent unauthorized access to stored data, but without sacrificing acceptable performance. Part of the security requirement entails a need to separate or segregate customers and their data, so that dynamic content from one customer cannot be used to access another customer's protected data.

For example, one customer could author a script that attempts to delete all files on the web server, all files within another customer's directory structure, or cause some other mischief. Solutions to this problem are complicated by the need to allow viewers of customer content to connect anonymously and automatically.

Some middleware or application-level software attempts to supply safeguards against unauthorized access by users of that software. For example, PHP (PHP Hypertext Processor) includes a safe-mode of operation that attempts to reduce the ability of an anonymous content viewer or user to cause damage when running a PHP script. But, like virtually all application-level software, it has holes that can be exploited.

Another solution to the need for a security scheme to safely allow dynamic content to be served without drastically impacting performance involves the use of virtual machines. In this scheme, a virtual machine or virtual server is constructed for each customer on the server. This solution is processor-intensive because of the need to establish many virtual environments, and can be very expensive because resources must be licensed on each virtual machine. Further, some mapping resource would have to be employed to map content viewers to the correct customer's virtual machine.

IIS (Internet Information Services) by Microsoft® includes an associated metabase that maps statically coded URLs (Uniform Resource Locator)—corresponding to content that viewers may request—to a particular user account to apply to each request. However, a metabase is limited in capacity (i.e., how many mappings it can store) and cannot scale to support a web server that may serve content from tens of thousands or hundreds of thousands of websites.

If multiple web servers and metabases were to be implemented in order to host a large number of web sites, further complications would arise. Because a metabase has limited capacity, supporting a number of sites greater than one metabase's capacity requires content requests to be pre-processed. Pre-processing causes each request to be directed to the correct server (i.e., the server with the metabase corresponding to the requested web site).

Because redundancy in serving web sites is desirable, each metabase would be replicated among a pool of servers to provide failover protection. This can make sharing metabases challenging, especially when the hosted web sites are dynamic—meaning that they change at the whim of the customers, perhaps to modify their naming criteria, remove a web service, etc.

Solutions that result in duplication of data without adequate tools for managing replication of that data have proven to be expensive and prone to error. Further expense is incurred when providing servers to support groups of distinct metabases rather than a single metabase.

Another problem with supporting anonymous access to content on a web server is the burden of repeatedly contacting a domain controller (or other authentication entity) to authenticate each virtual viewer session (e.g., to logon each request to a default anonymous user account). This burden can cause performance degradation not only in the web server, but also in a filer that accepts SMB (Server Message Block) network logons associated with a web server logon session.

Caching anonymous logon sessions on the web server typically is not feasible, especially if viewer requests for content are distributed among multiple processes, because a logon handle or context is only valid, by default, in the process in which it loaded. Requests may be distributed among multiple processes to help prevent one customer's malicious or faulty script from adversely affecting the run-time experience of other viewers. Existing logon caching schemes do not allow inter-process communication to permit the sharing of logon handles, and the overhead of establishing separate caching schemes for every process would yield little or no overall benefit.

SUMMARY

In some embodiments of the invention, a system and methods are provided for segregating access to dynamic content on multiple websites hosted by a web server, while caching logon handles or tokens for sharing among multiple processes.

In these embodiments, when a request is received for dynamic content from a website, it is first associated with (e.g., logged on as) a default anonymous user account. A UserRetriever filter module then retrieves a username and password corresponding to the website, from a database that is separate from the web server and used for other purposes (e.g., billing, website domain information, service provisioning, identifying where content is stored). The database acts as a central data source for operation of the web server, and obviates the need for a specialized database that merely maps between requested content and user accounts that may be used for the requests (e.g., a metabase implemented with IIS).

Based on the username and password obtained by the UserRetriever module, a UserImpersonator extension module requests a logon handle or token for that username from a logon cache manager, and may provide the username and password. The cache manager logs on as that user if a handle is not cached, then duplicates and returns the requested logon handle. In these embodiments of the invention, the user account is configured with appropriate privileges to access the requested content, but not to view, modify or interact with other websites on the same server or filer.

The logon handle is attached to the request so that the request will be completed using the impersonated user account instead of the default anonymous user account with which the request was initially associated. The dynamic content is retrieved and served as this specific, restricted, impersonated user account; therefore, software commands operating on this thread of execution can only access resources that have explicitly granted privileges to this user. After the content is retrieved or the script processing is complete, the applied logon handle is stripped off and the request is re-associated with the default anonymous user account before the request is terminated.

In some embodiments, impersonation of user accounts may be implemented to restrict access to a website's content to a user account corresponding to that site as described above, without caching logon handles.

DETAILED DESCRIPTION

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In some embodiments of the invention, a system and method are provided for segregating or isolating customers' content in a web server that serves dynamic content (e.g., scripts, executables) for multiple customers (each customer representing a hosted website), such that each customer's dynamic content is prevented from accessing other customers' data without permission.

In one implementation, viewers (e.g., Internet users) connect to the web server anonymously (and are initially associated with a default anonymous user account). Then, based on the content they have requested, they (or their requests) are logged into a user account associated with the customer that owns the requested content. That user account is granted access privileges for the associated customer's content, but is blocked from accessing other customers' content. Because the user account, like the content, is defined by the operating system, the operating system's mechanism for controlling resource access (e.g., an Access Control List or ACL) can be leveraged.

In some embodiments of the invention, a scheme for caching logon sessions on a web server is provided. This embodiment may be implemented to permit a single logon to a user account associated with a customer website to be shared among multiple processes handling requests for content from that website. Performance of the web server is enhanced because it does not need to invoke a domain controller or other authentication agent for every request that targets that website, and the caching is performed by a central process rather than being performed in parallel by the multiple request-handling processes.

Figure 1:
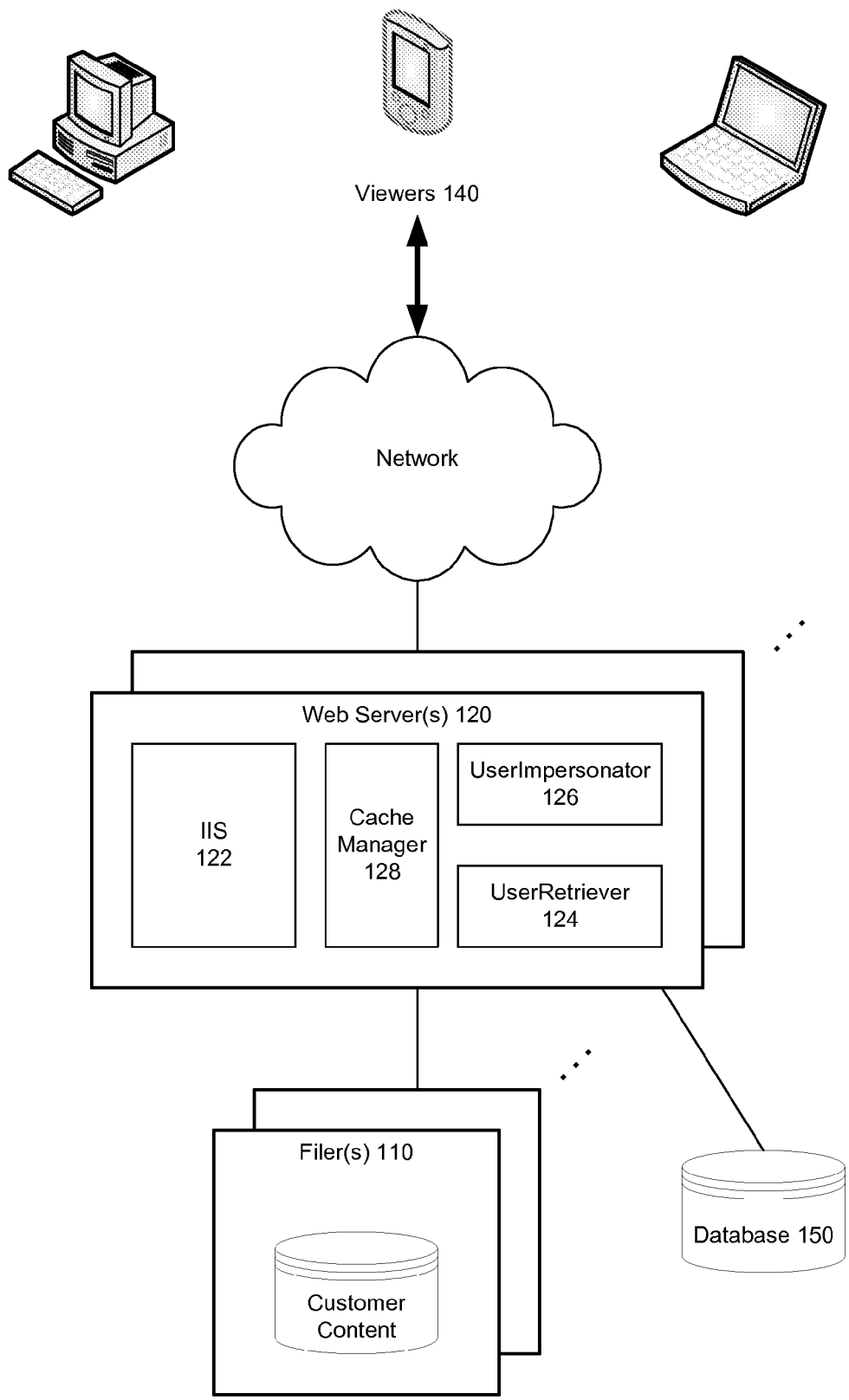
FIG. 1 is a block diagram depicting a webhosting environment in which embodiments of the present invention may be implemented.

FIG. 1 is a block diagram of a webhosting environment in which some embodiments of the invention may be implemented. Filer(s) 110, which may include any number of filers or fileservers, store content of approximately one hundred thousand customer websites. Similarly, web server(s) 120 operate cooperatively to serve the customers' content to viewers 140. Viewers/users may connect to the web servers directly or through a local or wide-area network (e.g., the Internet).

Filers 110 and web servers 120 may be collocated or geographically dispersed. Every web server is capable of serving content from every customer's site, regardless of which filer the content is stored on and which website owns the content.

Database 150 may be operated by the organization that operates web server(s) 120, and stores operational and/or management data such as the addresses/locations of filer(s) 110, locations of or paths to customers' content, which user account to use for access to each customer's content (and the corresponding password), billing records, service provisioning information (e.g., disk space, bandwidth), website domain name(s), login and usage statistics, marketing information, etc. Many of these attributes are not stored in a metabase.

A web server 120 includes IIS (Internet Information Services) software 122 or some other web service software (e.g., Apache). The web server is configured to serve dynamic content offered by the customers, such as scripts and/or executable files. Illustrative script languages that may be supported include, but are not limited to, PHP, ASP (Active Server Pages) and JSP (Java Server Pages). Web server 120 therefore includes engines, interpreters or parsers as needed to support the script languages, as exemplified by PHP engine 122.

Web server 120 also includes various ISAPI (Internet Server Application Programming Interface) filters and extensions, such as UserRetriever module 124 (an ISAPI filter), and UserImpersonator module 126 (an ISAPI extension).

In the illustrated embodiment of the invention, UserRetriever 124 is configured to access database 150 when a viewer request for content is received at web server 120. The UserRetriever module retrieves a username and password to be used for the request (based on the content request), and possibly other information (e.g., location of or path to the requested content).

Some or all of the retrieved information is passed to UserImpersonator 126, which attaches a logon token for the user account to the thread handling a viewer content request. The request is then passed to a script engine or other process configured to actually retrieve and serve the content while impersonating the user account identified by UserRetriever 124.

More specifically, a process or thread servicing a content request (e.g., an instance of UserImpersonator 126) calls cache manager 128 with the username and password previously retrieved from database 150, instead of performing the logon itself. The cache manager searches its cache for a logon handle for that user account, duplicates the handle and returns it to the requester. If not found, it calls the appropriate logon service (e.g., Windows' LogonUser), caches the resulting handle, duplicates it and serves it to the requester.

As indicated above, cache manager 128 maintains a cache of logon handles or tokens for sharing among the processes and/or threads that service content requests. The cache (not shown in FIG. 1) may comprise a hash table, a database, a flat file or some other structure.

In some embodiments of the invention cache manager 128 may be omitted, in which case logon handles for user accounts may not be cached. Instead, each instance of UserImpersonator 126 may call the appropriate logon utility directly.

In some other embodiments of the invention, either or both UserRetriever 124 and UserImpersonator 126 may be omitted or replaced by other entities performing the same or similar functions. In yet other embodiments, any of the components illustrated in FIG. 1 may be merged or further divided.

Figure 2:
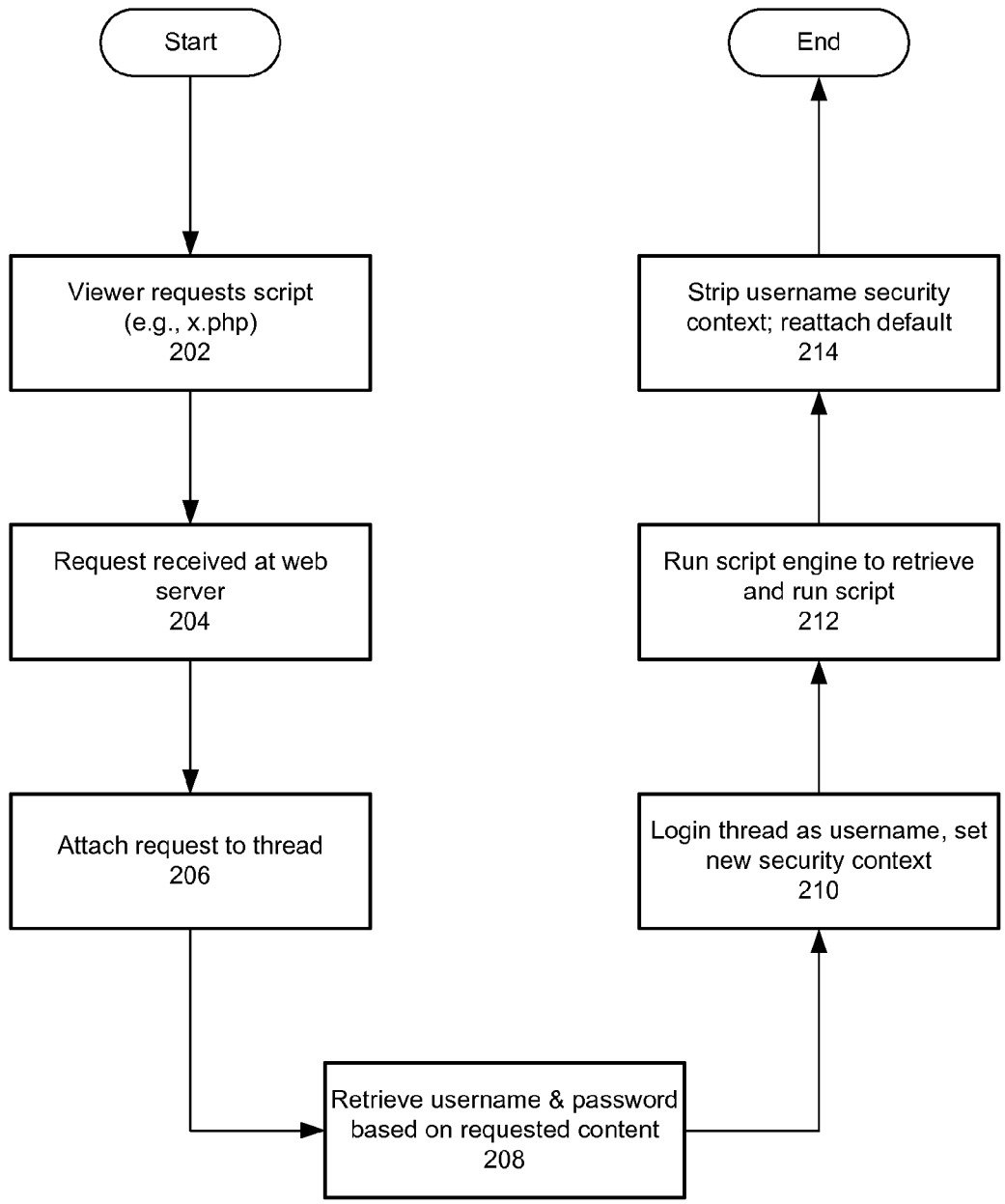
FIG. 2 is a flowchart illustrating one method of segregating anonymous access to dynamic content in a webhosting environment, in accordance with an embodiment of the invention.

FIG. 2 is a flowchart demonstrating a method of facilitating the serving of dynamic content from multiple customer websites, without allowing one customer's content to access another's, according to an embodiment of the invention.

In operation 202, via his or her browser a viewer requests dynamic content from Customer1's website (e.g., z.php). Although the illustrated method of the invention is described as it may be performed in relation to a PHP script, those of ordinary skill in the art will appreciate how this method may be modified to work with other types of dynamic content (e.g., ASP scripts, JSP scripts, executable images) without exceeding the scope of the present invention.

In operation 204, the viewer's request is delivered to a web server. In an illustrative implementation of this embodiment of the invention, an organization may operate a cluster, farm or other cooperative collection of multiple web servers (e.g., 5, 10), each of which is capable of serving content for each of the organization's customers—of which there may be in excess of one hundred thousand. A load balancer, router or other entity may be used to distribute requests among the servers.

Viewer requests may be distributed among any number of threads and/or processes. For example, each request will be assigned to a different thread in a pool of threads, and any number of threads may be handled by a given process. In one implementation, however, a round-robin (or other scheduling scheme) is used to distribute viewer content requests among multiple processes (e.g., 100). The number of processes is limited to minimize resource contention and promote process isolation, which increases stability and security. This helps ensure that each viewer's experience is decoupled as much as possible from other viewers' experiences.

In operation 206, a listener on the web server hears the request and attaches a security context for a default anonymous user. In different embodiments of the invention, different web server software may be executed, such as IIS, Apache, Lighttpd, nginx, etc. Also in operation 206, the web server invokes UserRetriever 124 (of FIG. 1) or another custom ISAPI filter or similar entity.

In operation 208, the UserRetriever filter performs a lookup in a database that is not closely tied to the web server. Thus, if the web server is IIS, the lookup is not performed in the associated metabase.

More particularly, the database is used by the operator of the web server for other purposes in addition to identifying user accounts to use for segregating anonymous access to dynamic content of different websites. For example, the database may be used for billing customer websites, tracking traffic patterns, etc. Because this database is updated whenever configuration of the web servicing environment changes (e.g., a website changes its name, a website is added or removed), it will always reflect the current configuration.

If, instead of using this separate database to identify user accounts to apply to requests for dynamic content, a database associated with or tied to the web server were used to determine which user account to apply for a content request (e.g., the metabase that accompanies IIS), unnecessary duplication would ensue. This would significantly complicate the process of managing web server configuration and operation (e.g., synchronization would have to be maintained), and would also introduce problems of scalability, as described above.

The lookup in the database is based on the requested content item (e.g., the exact URL that was requested, a pattern that matches the requested URL), and returns a username and password that will be used to assign a different security context to the request's thread—a context associated with Customer1. The lookup may also return a location of the requested content (e.g., path, network address).

In this embodiment of the invention, access to the filers, fileservers or other storage devices that contain customers' content is controlled by access control lists or other means enforced by the operating system. Each customer is associated (in the database) with a user account that has proper security credentials for accessing that customer' content, but not other customers'.

After the lookup is completed, control of the thread is returned to the web server. The web server invokes a custom ISAPI extension associated with PHP scripts—in this case UserImpersonator 126 of FIG. 1. Different custom ISAPI extensions may be configured for different types of dynamic content, or multiple types may be handled by one custom extension. Multiple instances of UserImpersonator may execute in parallel, in separate processes.

In operation 210, UserImpersonator attaches to the request thread a logon token for the username retrieved in the lookup of operation 208 (e.g., CustomerUser1), using the retrieved password, and sets the thread's context to match that user account.

In different embodiments of the invention, UserImpersonator may obtain the logon token, or handle, in different ways. For example, FIG. 3 describes a method in which a cache manager (e.g., Cache Manager 128 of FIG. 1) caches logon handles for sharing among multiple processes. In other embodiments of the invention, UserImpersonator may obtain a logon handle directly, by invoking the appropriate logon utility or service (e.g., Windows' LogonUser).

In operation 212, an engine, interpreter, parser or other module capable of executing the requested content is invoked, such as a PHP engine. The PHP engine retrieves the requested content (e.g., using the path identified by UserRetriever) and parses and executes the content. Because the script is executed within a security context associated with the owner of the requested content, the content can run correctly, but without the opportunity to impact other customers' data. Control of the thread is then returned to the UserImpersonator module.

In operation 214, the impersonated security context and logon token are stripped and the default anonymous user context may be reattached, and the method ends.

Figure 3:
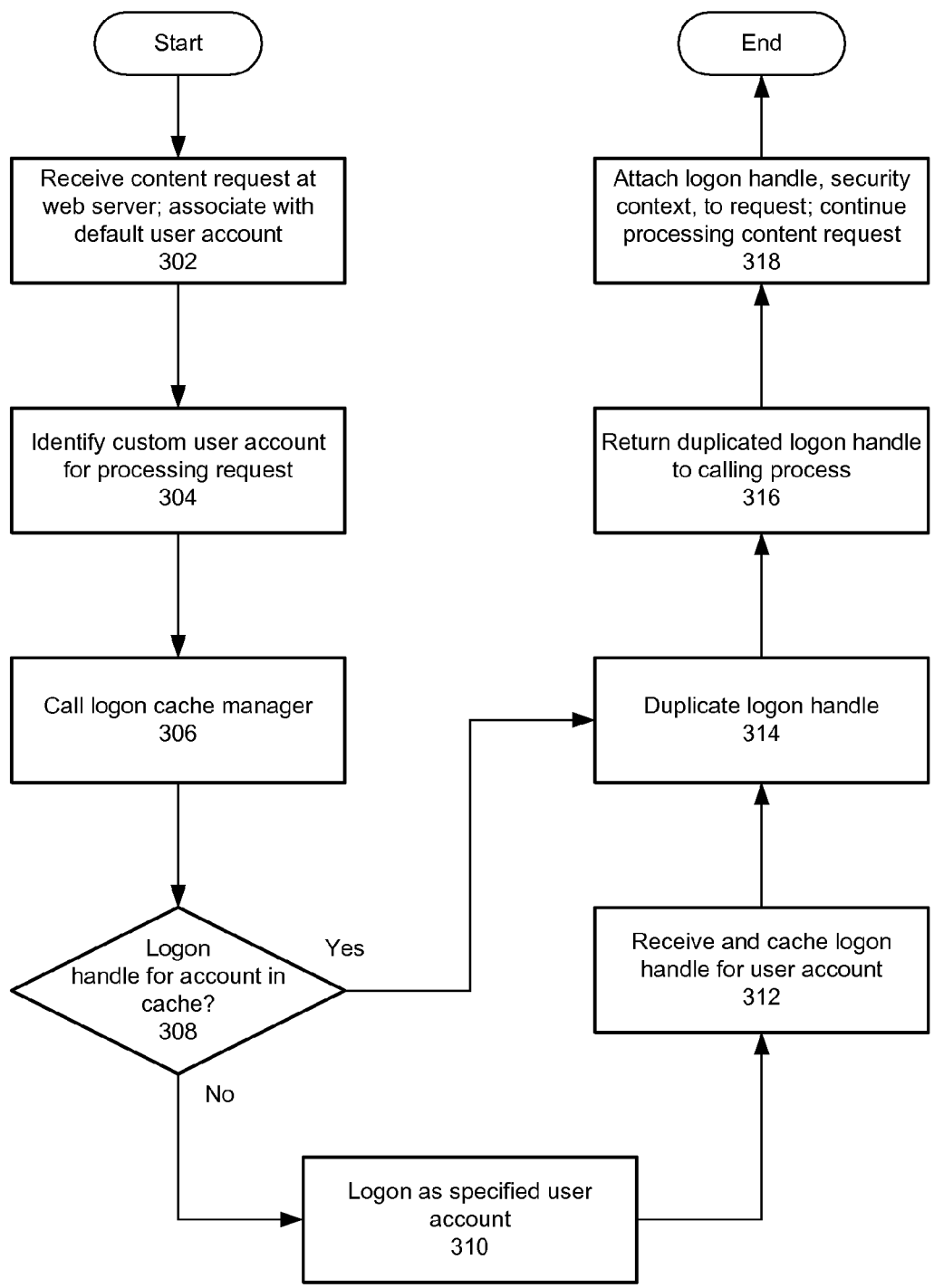
FIG. 3 is a flowchart illustrating one method of caching logon handles for use in multiple concurrent processes in a webhosting environment, in accordance with an embodiment of the invention.

FIG. 3 is a flowchart demonstrating a method of caching logon handles on a web server for use by multiple processes for serving content, according to an embodiment of the invention.

In operation 302, a request for content from one of multiple websites hosted on a web server is received at the web server. The web server may be just one server of multiple working cooperatively to promote redundancy and performance, but each server is configured to serve content for each of the websites. In other words, content requests need not be routed to a specific web server (or subset of servers) configured to serve just a portion of the content of all websites.

In operation 304, a user account having a security context to apply to the request is identified. In one implementation the account may be identified as described above in conjunction with FIG. 2 (e.g., by referring to a database separate from the web server).

In particular, a default anonymous user account and security context may be applied to the request when it is received at the web server, after which a custom software module may be invoked to retrieve the target user account's name and password from a database separate from the web server. Different user accounts may be specified for each website hosted by the server(s).

In operation 306, a web server process configured to facilitate handling of the content request calls a logon cache manager, another process executing on the server. The logon cache manager is configured to manage a cache of logon handles for the various user accounts identified in the database. The calling process identifies itself (e.g., by process id) and supplies the user account and password for the logon handle it needs.

In operation 308, the cache manager searches its cache for a logon handle matching the specified user account. If it finds a match, the method advances to operation 314; otherwise, it continues at operation 310.

In operation 310, the cache manager invokes a logon utility or service of the operating system, using the specified username and password.

In operation 312, the cache manager receives a logon handle for the user account and stores it in the cache. The logon handle may be converted as necessary, into an integer value for example.

In operation 314, the cache manager duplicates the logon handle for the specified user account using a utility or service offered by the operating system (e.g., DuplicateHandle for Windows), for the process id supplied by the calling process.

In operation 316, the cache manager transmits the logon handle to the calling process. In one implementation, the cache manager and calling process communicate via named pipes, although other methods of inter-process communication may be employed in other implementations.

In operation 318, the calling process attaches the duplicated logon handle or token to the thread associated with the content request. The process then continues resolving the request, or passes it to another entity as necessary (e.g., a script engine configured to retrieve and execute the content if it comprises a script).

In some embodiments of the invention, the security context and logon handle of the target user account is stripped from the request before the request is terminated.

Figure 4:
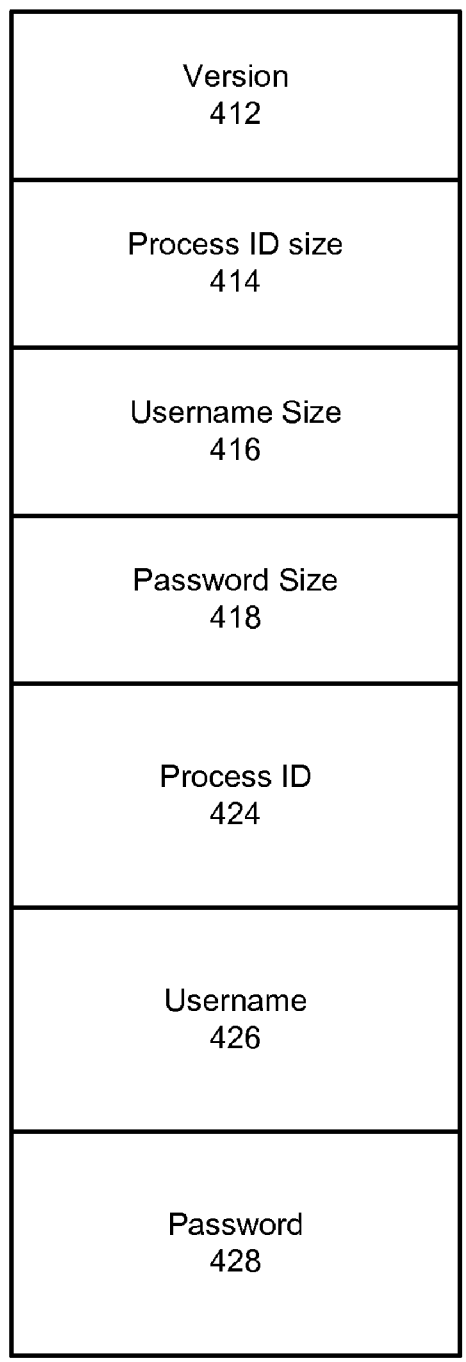
FIG. 4 depicts a data structure for requesting a cached logon handle, in accordance with an embodiment of the present invention.

FIG. 4 depicts a data structure for conveying a request for a logon handle to a logon cache manager, according to one embodiment of the invention. In this embodiment, logon handle request structure 410 comprises version 412, size fields 414, 416, 418, process id 424, target username 426 and target password 428.

Process id 424 identifies the process that has submitted the logon handle request to the logon cache manager, target username 426 identifies the user account for which a logon handle has been requested, and target password is the password of the user account, which the logon cache manager may need in order to logon to that account (if a logon handle for the account is not currently cached). Size fields 414, 416 and 418 identify the sizes of data fields 424, 426 and 428, respectively.

One of ordinary skill in the art will appreciate that data structures having other forms may be developed to facilitate the caching and sharing of logon handles, without exceeding the scope of the current invention.

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof.

In particular, methods described herein may be implemented using data structures and program code residing on a suitable computer-readable medium, which may be any device or medium that can store data and/or code for use by a computer system. This includes, but is not limited to, volatile memory, non-volatile memory, magnetic and optical storage devices such as disk drives, magnetic tapes, CDs (compact discs), DVDs (digital versatile discs or digital video discs), or other media capable of storing computer-readable media now known or later developed.

The foregoing embodiments of the invention have been presented for purposes of illustration and description only. They are not intended to be exhaustive or to limit the invention to the forms disclosed. Accordingly, the scope of the invention is defined by the appended claims, not the preceding disclosure.

What is claimed is:

1. An automated method of impersonating a user account associated with a website to serve dynamic content from that website, the method comprising:
   receiving at a web server a request for dynamic content of a first website hosted by the web server;
   associating the request for dynamic content with a default anonymous user account on the web server;
   identifying a custom user account corresponding to the first website, in a database separate from the web server, wherein the custom user account is configured with permission to access content of the first website but not content of a second website hosted by the web server;
   invoking a logon cache manager configured to cache logon handles for sharing among multiple processes executing on the web server;
   at the logon cache manager:
      searching a cache for a logon handle for the custom user account;
      if said search of the cache fails:
         logging in as the custom user account;
         receiving the logon handle for the custom user account and storing the logon handle in the cache;
         duplicating the logon handle for the custom user account; and
         returning the duplicate logon handle in response to said invoking; and
      if said search of the cache succeeds:
         duplicating the logon handle for the custom user account; and
         returning the duplicate logon handle in response to said invoking;
   associating the request for dynamic content with the custom user account instead of the default anonymous user account, by attaching the duplicate logon handle to the request for dynamic content;
   serving the requested dynamic content; and
   before the request is terminated, removing the duplicate logon handle from the request for dynamic content and re-associating the request for dynamic content with the default anonymous user account instead of the custom user account.

2. The method of claim 1, wherein:
   said serving comprises invoking an entity configured to execute the dynamic content.

3. The method of claim 1, wherein the default anonymous user account is an account under which anonymous requests for content are logged on.

4. The method of claim 1, wherein the database comprises information for managing operation of the web server, in addition to a mapping of given website content to a given user account to use for accessing the given website content.

5. The method of claim 4, wherein said information comprises a path to the requested dynamic content.

6. The method of claim 4, wherein said information comprises one or more of:
   billing data;
   service provisioning information;
   attributes of the website; and
   usage statistics of the website.

7. The method of claim 1, wherein the database is a database other than a metabase implemented with Internet Information Services software.

8. The method of claim 1, wherein said attaching the duplicate logon handle to the request comprises attaching the duplicate logon handle to a thread of execution associated with the request.

9. The method of claim 1, wherein:
   said invoking a logon cache manager comprises transmitting to the logon cache manager a request for the logon handle for the custom user account; and
   said request for the logon handle comprises a name of the custom user account, a password for the custom user account and an identifier of a process issuing said request for the logon handle.

10. A non-transitory computer readable medium storing instructions that, when executed by a computer, cause the computer to perform a method of impersonating a user account associated with a website to serve dynamic content from that website, the method comprising:
    receiving at a web server a request for dynamic content of a first website hosted by the web server;
    associating the request for dynamic content with a default anonymous user account on the web server;
    identifying a custom user account corresponding to the first website, in a database separate from the web server, wherein the custom user account is configured with permission to access content of the first website but not content of a second website hosted by the web server;
    invoking a logon cache manager configured to cache logon handles for sharing among multiple processes executing on the web server; at the logon cache manager:
       searching a cache for a logon handle for the custom user account;
       if said search of the cache fails:
          logging in as the custom user account;
          receiving the logon handle for the custom user account and storing the logon handle in the cache;
          duplicating the logon handle for the custom user account; and
          returning the duplicate logon handle in response to said invoking; and
       if said search of the cache succeeds:
          duplicating the logon handle for the custom user account; and
          returning the duplicate logon handle in response to said invoking;
    associating the request for dynamic content with the custom user account instead of the default anonymous user account, by attaching the duplicate logon handle to the request for dynamic content;
    serving the requested dynamic content; and
    before the request is terminated, removing the duplicate logon handle from the request for dynamic content and re-associating the request for dynamic content with the default anonymous user account instead of the custom user account.

11. A computer server configured to serve dynamic content from multiple websites, the server comprising:
    one or more hardware processors;

web server program instructions executable by the one or more processors to receive a request for dynamic content of a first website hosted by the computer server and associate a default anonymous user account with the request for dynamic content;

web server filter program instructions executable by the one or more processors to identify, in a database separate from the web server, a custom user account for accessing content of the first website, wherein the custom user account is unable to access content of a second website hosted by the computer server;

cache manager program instructions, executable by the one or more processors to:
    cache logon handles for sharing among multiple processes executing on the computer server;
    search a cache for a logon handle for the custom user account;
    if said search of the cache is unsuccessful:
        logon as the custom user account;
        receive the logon handle for the custom user account and store the logon handle in the cache;
        duplicate the logon handle; and
        return the duplicate logon handle to web server extension program instructions; and
    if said search of the cache is successful:
        duplicate the logon handle; and
        return the duplicate logon handle to the web server extension program instructions; and the web server extension program instructions executable by the one or more processors to:
    associate the request for dynamic content with the custom user account instead of the default anonymous user account, by attaching the duplicate logon handle to the request for the dynamic content; and
    after the requested dynamic content is executed, remove the duplicate logon handle from the request for dynamic content and re-associate the request with the default anonymous user account instead of the custom user account, before the request is terminated.

12. The server of claim 11, wherein said cache manager program instructions are further executable by the one or more processors to receive a request for the logon handle for the custom user account, comprising:
    a name of the custom user account;
    a password of the custom user account; and
    a process identifier of the web server extension program instructions.

13. The server of claim 11, further comprising a connection to the database, wherein the database is other than a metabase implemented with Internet Information Services software.

14. The server of claim 11, wherein the database comprises information for facilitating management of the web server, in addition to a mapping of the requested dynamic content to the custom user account.

15. The server of claim 11, wherein:
    said web server extension program instructions are further executable by the one or more processors to request the logon handle for the custom user account from said cache manager program instructions; and said cache manager program instructions are further executable by the one or more processors to receive the request for the logon handle for the custom user account.

\* \* \* \* \*